(12) United States Patent
Patrick et al.

(10) Patent No.: US 7,774,485 B2
(45) Date of Patent: Aug. 10, 2010

(54) DYNAMIC SERVICE COMPOSITION AND ORCHESTRATION

(75) Inventors: Paul B. Patrick, Manchester, NH (US); Ashok Aletty, Saratoga, CA (US); Jayaram Kasi, San Jose, CA (US); Chet Kapoor, San Jose, CA (US); Tolga Urhan, Palo Alto, CA (US); Matthew Mihic, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 1058 days.

(21) Appl. No.: 11/133,917

(22) Filed: May 20, 2005

(65) Prior Publication Data

US 2006/0212593 A1    Sep. 21, 2006

Related U.S. Application Data

(60) Provisional application No. 60/573,354, filed on May 21, 2004, provisional application No. 60/573,717, filed on May 21, 2004.

(51) Int. Cl.
    *G06F 15/16* (2006.01)
(52) U.S. Cl. .................................................. 709/229
(58) Field of Classification Search ................. 709/229; 726/8
    See application file for complete search history.

(56) References Cited

U.S. PATENT DOCUMENTS

| | | | |
|---|---|---|---|
| 4,604,686 A | 8/1986 | Reiter et al. ................. 364/200 |
| 4,975,914 A | 12/1990 | Ashton et al. ............... 371/11.2 |
| 5,109,515 A | 4/1992 | Laggis et al. ................ 395/725 |
| 5,224,098 A | 6/1993 | Bird ............................ 370/94.1 |
| 5,249,293 A | 9/1993 | Schreiber et al. ............ 395/650 |
| 5,265,250 A | 11/1993 | Andrade et al. ............. 395/650 |
| 5,280,610 A | 1/1994 | Travis et al. ................. 395/600 |
| 5,329,619 A | 7/1994 | Page et al. ................... 395/200 |
| 5,546,549 A | 8/1996 | Barrett et al. | |
| 5,724,509 A | 3/1998 | Starkweather et al. | |
| 5,828,832 A | 10/1998 | Holden et al. .......... 395/187.01 |
| 5,835,087 A | 11/1998 | Herz et al. | |
| 5,931,917 A | 8/1999 | Nguyen et al. | |
| 6,058,391 A | 5/2000 | Gardner | |
| 6,167,446 A | 12/2000 | Lister et al. | |

(Continued)

FOREIGN PATENT DOCUMENTS

WO    WO91 5417    4/1991

OTHER PUBLICATIONS

Liquid Data: XQuery-Based Enterprise Information Integration by Nitin Mangtani, Mike Carey Nov. 18, 2004 http://dev2dev.bea.com/lpt/a/186, pp. 1 of 9; (last visited: May 16, 2005).

(Continued)

*Primary Examiner*—Nathan Flynn
*Assistant Examiner*—Chirag R Patel
(74) *Attorney, Agent, or Firm*—Fliesler Meyer LLP

(57) ABSTRACT

A system, method and media for service infrastructure that enables dynamic service composition and orchestration. This description is not intended to be a complete description of, or limit the scope of, the invention. Other features, aspects and objects of the invention can be obtained from a review of the specification, the figures and the claims.

21 Claims, 11 Drawing Sheets

U.S. PATENT DOCUMENTS

| | | | |
|---|---|---|---|
| 6,212,640 B1 | 4/2001 | Abdelnur et al. | |
| 6,226,752 B1 | 5/2001 | Gupta et al. | |
| 6,268,850 B1 | 7/2001 | Ng | |
| 6,363,499 B1 | 3/2002 | Delo et al. | |
| 6,516,411 B2 | 2/2003 | Smith | |
| 6,615,216 B1 | 9/2003 | Hu et al. | |
| 6,618,737 B2 | 9/2003 | Aridor et al. | |
| 6,640,240 B1 | 10/2003 | Hoffman et al. | |
| 6,681,220 B1 | 1/2004 | Kaplan et al. | |
| 6,801,916 B2 | 10/2004 | Roberge et al. | |
| 6,826,568 B2 | 11/2004 | Bernstein et al. | |
| 6,894,979 B1 | 5/2005 | Lee | |
| 6,944,623 B2 | 9/2005 | Kim | |
| 6,973,460 B1 | 12/2005 | Mitra | |
| 7,017,175 B2 | 3/2006 | Alao et al. | |
| 7,024,580 B2 | 4/2006 | Guimbellot et al. | |
| 7,076,508 B2 | 7/2006 | Bourbonnais et al. | |
| 7,155,447 B2 | 12/2006 | Roberge et al. | |
| 7,181,490 B1 | 2/2007 | Harvey et al. | |
| 7,209,916 B1 | 4/2007 | Seshadri et al. | |
| 7,242,925 B2 | 7/2007 | O'Neil et al. | |
| 7,246,263 B2 | 7/2007 | Skingle | |
| 7,269,665 B2 * | 9/2007 | Pauly et al. | 709/246 |
| 7,296,235 B2 * | 11/2007 | Bhat et al. | 715/744 |
| 7,451,217 B2 * | 11/2008 | Wardrop | 709/225 |
| 2001/0044811 A1 | 11/2001 | Ballantyne et al. | |
| 2001/0051949 A1 | 12/2001 | Carey et al. | |
| 2002/0031230 A1 * | 3/2002 | Sweet et al. | 380/278 |
| 2002/0036982 A1 | 3/2002 | Chen | |
| 2002/0059345 A1 | 5/2002 | Wang et al. | |
| 2002/0073180 A1 | 6/2002 | Dewhurst et al. | |
| 2002/0099818 A1 | 7/2002 | Russell et al. | |
| 2002/0120723 A1 | 8/2002 | Forth et al. | |
| 2002/0160745 A1 | 10/2002 | Wang | |
| 2003/0004746 A1 | 1/2003 | Kheirolomoom et al. | |
| 2003/0028654 A1 | 2/2003 | Abjanic et al. | |
| 2003/0074413 A1 | 4/2003 | Nielsen et al. | |
| 2003/0093500 A1 | 5/2003 | Khodabakchian et al. | |
| 2003/0101251 A1 | 5/2003 | Low | |
| 2003/0105800 A1 | 6/2003 | Cullen | |
| 2003/0115370 A1 | 6/2003 | Jacquin et al. | |
| 2003/0135556 A1 | 7/2003 | Holdsworth | |
| 2003/0135628 A1 * | 7/2003 | Fletcher et al. | 709/229 |
| 2003/0142680 A1 | 7/2003 | Oguchi | |
| 2003/0149934 A1 | 8/2003 | Worden | |
| 2003/0172145 A1 | 9/2003 | Nguyen | |
| 2003/0187707 A1 | 10/2003 | Hack et al. | |
| 2003/0188039 A1 | 10/2003 | Liu et al. | |
| 2003/0204517 A1 | 10/2003 | Skinner et al. | |
| 2003/0212999 A1 | 11/2003 | Cai | |
| 2003/0236690 A1 | 12/2003 | Johnston-Watt et al. | |
| 2004/0028212 A1 | 2/2004 | Lok et al. | |
| 2004/0039727 A1 | 2/2004 | Dessloch et al. | |
| 2004/0068649 A1 | 4/2004 | Haller et al. | |
| 2004/0162741 A1 | 8/2004 | Flaxer et al. | |
| 2004/0163088 A1 | 8/2004 | Frender et al. | |
| 2004/0168184 A1 | 8/2004 | Steenkamp et al. | |
| 2004/0181543 A1 | 9/2004 | Wu et al. | |
| 2004/0225670 A1 | 11/2004 | Cameron et al. | |
| 2005/0015773 A1 | 1/2005 | Gorman et al. | |
| 2005/0021772 A1 | 1/2005 | Shedrinsky | |
| 2005/0080914 A1 | 4/2005 | Lerner et al. | |
| 2005/0086360 A1 | 4/2005 | Mamou et al. | |
| 2005/0132382 A1 | 6/2005 | McGuire et al. | |
| 2005/0149517 A1 | 7/2005 | Cosic | |
| 2005/0177616 A1 | 8/2005 | Addington et al. | |
| 2005/0182787 A1 | 8/2005 | Oswalt | |
| 2005/0228863 A1 | 10/2005 | Palmeri et al. | |
| 2005/0234969 A1 | 10/2005 | Mamou et al. | |
| 2005/0240621 A1 | 10/2005 | Robertson et al. | |
| 2007/0005777 A1 | 1/2007 | Fremantle et al. | |

OTHER PUBLICATIONS

ComputerWorld—Driving the Enterprise Service Bus, Paul Krill, InfoWorld Jun. 16, 2003; 5 pages.

BeaLiquid Data for WebLogic™, Concepts Guide, Version 8.1; Document Date: Jul. 2003; Revised: Dec. 2003; Part No: 886-002005-003.

The Most Cost Effective Solution for Data Integration: Application Router™ 1000, Cast Iron Systems—Rethink Integration; 2005 Cast Iron Systems, 7 pages; (last printed: May 31, 2005) http://www.castironsys.com/products.shtml.

Cast Iron Systems Platform, Version 2.3—Mar. 2004—Product Overview, 5 pages. 2004, Cast Iron Systems. http://www.castironsys.com.

Cast Iron Application Router™ 1000—Technical Brochure, 8 pages; 2004 Cast Iron Systems www.castironsys.com.

EntireX, XML-Powered Integration—White Paper; Software AG, The XML Company, 19 pages; Sep. 2002 www.softwareag.com.

Blue Titan Network Director, Blue Titan Software, 4 pages, 2003 Blue Titan, Inc. www.bluetitan.com.

Rethink Integration™ 2004 Cast Iron Systems. www.castironsys.com.

Sonic ESB Datasheet, 4 pages, 2004 Sonic Software Corporation, www.sonicsoftware.com.

Best-of-Breed ESBs, Identifying Best-of-Breed Characteristics in Enterprise Services Buses (ESBs), Jun. 2003, A White Paper from Steve Craggs, Vice-Chairman, EAI Industry Consortium, Sponsored by Sonic Software, 2003 Saint Consulting Limited.

Ohkawa, "Provide a Facade Interface for Enterprise Web Services," IBM Corporation, Jan. 6, 2004, 13 pages.

Yajaman, et al., "Web Service Facade for Legacy Applications," Microsoft Corporation, Jun. 2003, 25 pages.

* cited by examiner

DYNAMIC SERVICE COMPOSITION AND ORCHESTRATION

CLAIM OF PRIORITY

This application claims priority from the following co-pending applications, which are hereby incorporated in their entirety:

U.S. Provisional Application No. 60/573,354 entitled SYSTEM AND METHOD FOR ENTERPRISE APPLICATION INTEGRATION BUS, by Matthew Mihic et al., filed May 21, 2004.

U.S. Provisional Application No. 60/573,717 entitled LIQUID COMPUTING, by Alfred Chang et al., filed May 21, 2004.

CROSS-REFERENCE TO RELATED APPLICATIONS

This application is related to the following co-pending applications:

U.S. patent application Ser. No. 11/133,037 entitled "SERVICE ORIENTED ARCHITECTURE WITH MESSAGE PROCESSING STAGES," by Paul B. Patrick et al., filed May 19, 2005

U.S. patent application Ser. No. 11/132,558 entitled "SERVICE ORIENTED ARCHITECTURE WITH MESSAGE PROCESSING PIPELINES," by Paul B. Patrick et al., filed May 19, 2005

U.S. patent application Ser. No. 11/133,022 entitled "SERVICE ORIENTED ARCHITECTURE," by Paul B. Patrick et al., filed May 19, 2005

U.S. patent application Ser. No. 11/132,566 entitled "FAILSAFE SERVICE ORIENTED ARCHITECTURE," by Paul B. Patrick et al., filed May 19, 2005

U.S. patent application Ser. No. 11/132,575 entitled "SCALEABLE SERVICE ORIENTED ARCHITECTURE," by Paul B. Patrick et al., filed May 19, 2005

U.S. patent application Ser. No. 11/132,952 entitled "DYNAMICALLY CONFIGURABLE SERVICE ORIENTED ARCHITECTURE," by Paul B. Patrick et al., filed May 19, 2005

U.S. patent application Ser. No. 11/133,111 entitled "SECURE SERVICE ORIENTED ARCHITECTURE," by Paul B. Patrick et al., filed May 19, 2005

U.S. patent application Ser. No. 11/133,109 entitled "CO-LOCATED SERVICE ORIENTED ARCHITECTURE," by Paul B. Patrick et al., filed May 19, 2005

U.S. patent application Ser. No. 11/133,406 entitled "PROGRAMMABLE SERVICE ORIENTED ARCHITECTURE," by Paul B. Patrick et al., filed May 19, 2005

U.S. patent application Ser. No. 11/133,020 entitled "BATCH UPDATING FOR A SERVICE ORIENTED ARCHITECTURE," by Paul B. Patrick et al., filed May 19, 2005

U.S. patent application Ser. No. 11/132,557 entitled "RELIABLE UPDATING FOR A SERVICE ORIENTED ARCHITECTURE," by Paul B. Patrick et al., filed May 19, 2005

U.S. patent application Ser. No. 11/132,571 entitled "SERVICE ORIENTED ARCHITECTURE WITH FILE TRANSPORT PROTOCOL," by Paul B. Patrick et al., filed May 19, 2005

U.S. patent application Ser. No. 11/133,110 entitled "SERVICE ORIENTED ARCHITECTURE WITH ELECTRONIC MAIL TRANSPORT PROTOCOL," by Paul B. Patrick et al., filed May 19, 2005

U.S. patent application Ser. No. 11/133,117 entitled "DYNAMICALLY CONFIGURABLE SERVICE ORIENTED ARCHITECTURE," by Paul B. Patrick et al., filed May 19, 2005

U.S. patent application Ser. No. 11/131,566 entitled "PROGRAMMABLE MESSAGE PROCESSING STAGE FOR A SERVICE ORIENTED ARCHITECTURE," by Paul B. Patrick et al., filed May 19, 2005

U.S. patent application Ser. No. 11/131,839 entitled "SERVICE PROXY DEFINITION," by Paul B. Patrick et al., filed May 19, 2005

U.S. patent application Ser. No. 11/131,516 entitled "DYNAMIC ROUTING IN A SERVICE ORIENTED ARCHITECTURE RULES," by Paul B. Patrick et al., filed May 19, 2005

U.S. patent application Ser. No. 11/131,622 entitled "DYNAMIC PUBLISHING IN A SERVICE ORIENTED ARCHITECTURE," by Paul B. Patrick et al., filed May 18, 2005

U.S. patent application Ser. No. 11/131,794 entitled "SERVICE ORIENTED ARCHITECTURE WITH MONITORING RULES," by Paul B. Patrick et al., filed May 18, 2005

U.S. patent application Ser. No. 11/131,838 entitled "SERVICE ORIENTED ARCHITECTURE WITH INTERCHANGEABLE TRANSPORT PROTOCOLS," by Paul B. Patrick et al., filed May 18, 2005

U.S. patent application Ser. No. 11/132,134 entitled "SERVICE ORIENTED ARCHITECTURE WITH ALERTS RULES," by Paul B. Patrick et al., filed May 18, 2005

U.S. patent application Ser. No. 11/131,833 entitled "SERVICE ORIENTED ARCHITECTURE WITH CREDENTIAL MANAGEMENT," by Paul B. Patrick et al., filed May 18, 2005

U.S. patent application Ser. No. 11/131,841 entitled "SERVICE ORIENTED ARCHITECTURE WITH MESSAGE PROCESSING PIPELINES," by Paul B. Patrick et al., filed May 18, 2005

U.S. patent application Ser. No. 11/131,719 entitled "ERROR HANDLING FOR A SERVICE ORIENTED ARCHITECTURE," by Paul B. Patrick et al., filed May 18, 2005

U.S. patent application Ser. No. 11/132,139 entitled "DYNAMIC PROGRAM MODIFICATION," by Paul B. Patrick et al., filed May 18, 2005

U.S. patent application Ser. No. 11/131,840 entitled "DYNAMIC PROGRAM MODIFICATION," by Paul B. Patrick et al., filed May 18, 2005

FIELD OF THE DISCLOSURE

The present disclosure relates generally to a switching fabric having message processing capabilities through which processes can communicate and, more particularly, to web service middleware.

BACKGROUND

The need for enterprise software applications to work together with web browser-based front ends lead to the development of application servers. Application servers provide a framework for integrating front-end web applications with back-end enterprise applications. Beyond simply invoking enterprise applications from applications servers, a need arose to compose pieces of different enterprise applications into composite applications. One way this can be done is to expose an enterprise application as a set of reusable services that other systems can access. However, enterprise applications are typically deployed on multiple application platforms and in heterogeneous environments. These factors make the composition effort proprietary and programming-driven, resulting in brittle and expensive integrations. What is needed is an flexible infrastructure to dynamically compose services and handle any incompatibilities that might arise between them.

DETAILED DESCRIPTION

Figure 1A:
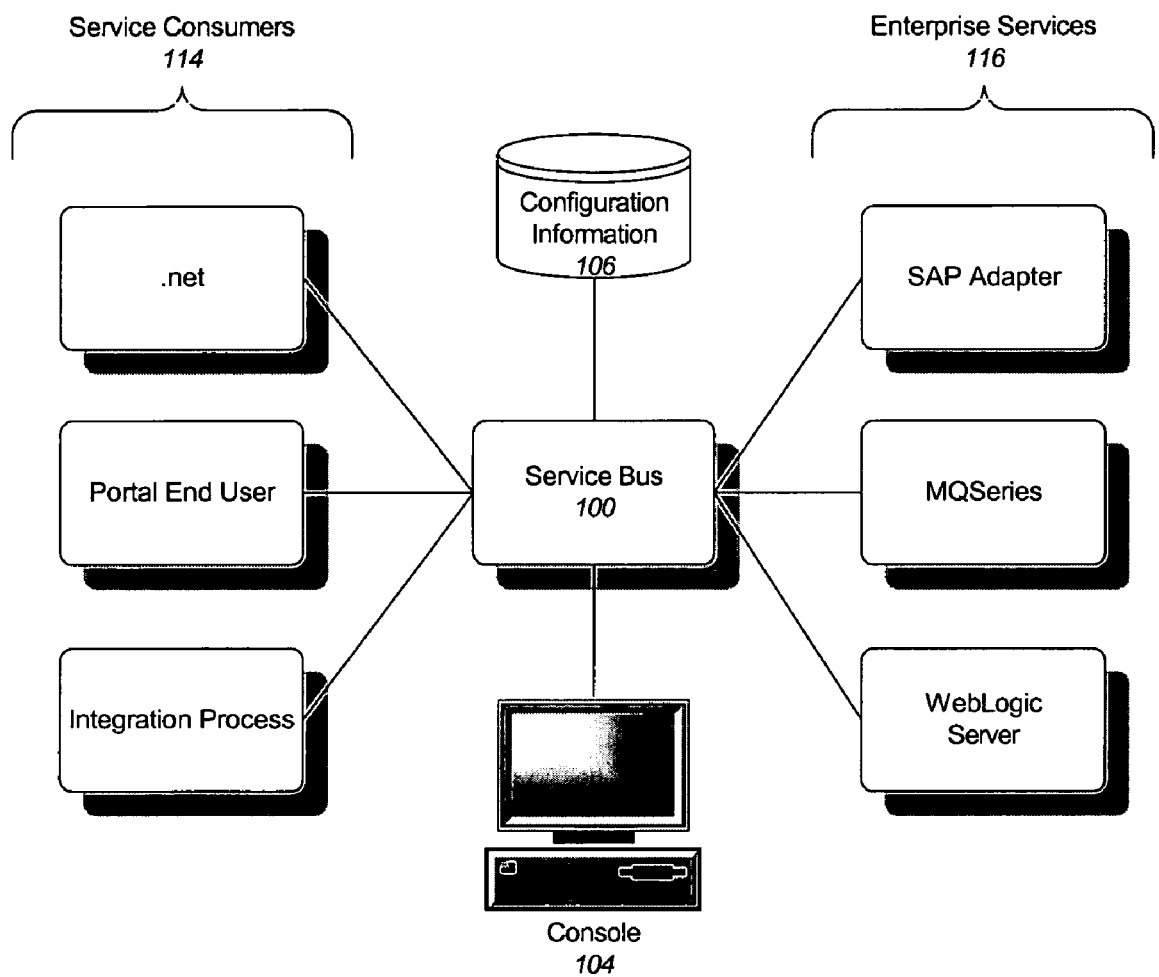
FIG. 1a is an illustration of a system in an embodiment.

The invention is illustrated by way of example and not by way of limitation in the figures of the accompanying drawings in which like references indicate similar items. References to embodiments in this disclosure are not necessarily to the same embodiment, and such references mean at least one. While specific implementations are discussed, it is understood that this is done for illustrative purposes. A person skilled in the relevant art can recognize that other components and configurations may be used without departing from the scope and spirit of the invention.

In the following description, numerous specific details are set forth to provide a thorough description of the invention. However, it can be apparent to one skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

Enterprise information is typically not all stored in a single data store, such as a database, but can be instead stored in individual silos from which each enterprise application must drink. Each silo can have its own differentiating features (e.g., storage mechanism, storage format, storage access mechanism, etc.). In an attempt to bring some order to the sea of information chaos, enterprises are turning to a Service Oriented Architecture (SOA) approach to integration. Using this architectural approach, the capabilities of applications and the access mechanisms to information sources are exposed as services. Services hide underlying implementation details from application programs.

In one embodiment, information sources are exposed as services. This concept focuses on hiding the implementation and access mechanism details of a given information source behind a service based interface (or facade). While an SOA approach could be done with any number of technologies, one embodiment uses of XML and Web Services. Using this approach, it is possible to hide whether the information source requires a SQL query, for example, to access the information within. Application development becomes focused on making service requests and handling service responses. In one embodiment, an information source can be turned into a service through use of a service proxy or a service adapter.

A service proxy can serve as an external wrapper which is installed in front of an information source, an application or a service. The proxy acts as a gateway and a facade through which access to the information source is performed. By way of illustration, a service proxy for accessing files in a file system could be created to access a file anywhere in a file system or be restricted to only certain areas of the file system. By way of further illustration, service proxies can hide the details of what a requesting entity or "consumer" is required to do in order to establish a session with the information source, transform the service request into the appropriate set of interactions in order to retrieve or update the information service, and then format the information to be returned to the consumer. By way of yet another illustration, the service proxy may hide the additional steps required to determine the actual results to be returned (e.g., the retrieval of additional meta-data, such as data sensitivity labels that may be stored in yet another information store, that need to be retrieved and evaluated before particular portions of the result set are to be returned).

In one embodiment, a service adapter is an embedded or integrated form of a service proxy. A service adapter is integrated into the request/response processing logic of a process (e.g., an information source) rather than operating externally from it.

In one embodiment, the SOA approach is extended with a service bus switching fabric. The service bus can provide the flexibility to allow data transformations and other services to be "plugged" into the bus and then reused by any number of different services and application components. This removes the need to hardwire a particular processing flow of services by allowing the processing flow to be described and then dynamically assembled. In one embodiment, applications can be assembled from any of the services which are "plugged" into the bus to create new information-based applications. In addition, through the orchestration of services, using standards such as Business Process Execution Language (BPEL), it is possible to dynamically change how an information technology infrastructure utilizes information sources, performs the data transformations, and incorporates capabilities provided by and to external partners to allow an enterprise to more efficiently execute its mission.

With reference to FIG. 1a and by way of illustration, the system includes a service bus 100 that represents a fusion of message brokering, web services, business-to-business (B2B) web services gateway and web services management concepts into a combination centered around a runtime configuration information directory/repository 106 and console 104. The service bus is an easy to use configuration-driven intermediary that accomplishes (without limitation) the following efficiently and with high availability, scalability and reliability:

Bridges the gap between what message sender 114 sends and what receiver 116 expects in the area of envelope protocol, transport protocol, security scheme, payload contents, one way and request/response paradigms, synchronous and asynchronous communication, point-to-point, and publish/subscribe.

Provides additional computing capability to perform tasks such as (but not limited to) multi-destination publish, content based routing, authentication and authorization, and credential mapping.

Provides monitoring capability with metrics collection and display, alert displays, tracking event collection and use, message archiving and Service Level Agreement (SLA) management.

Figure 1B:
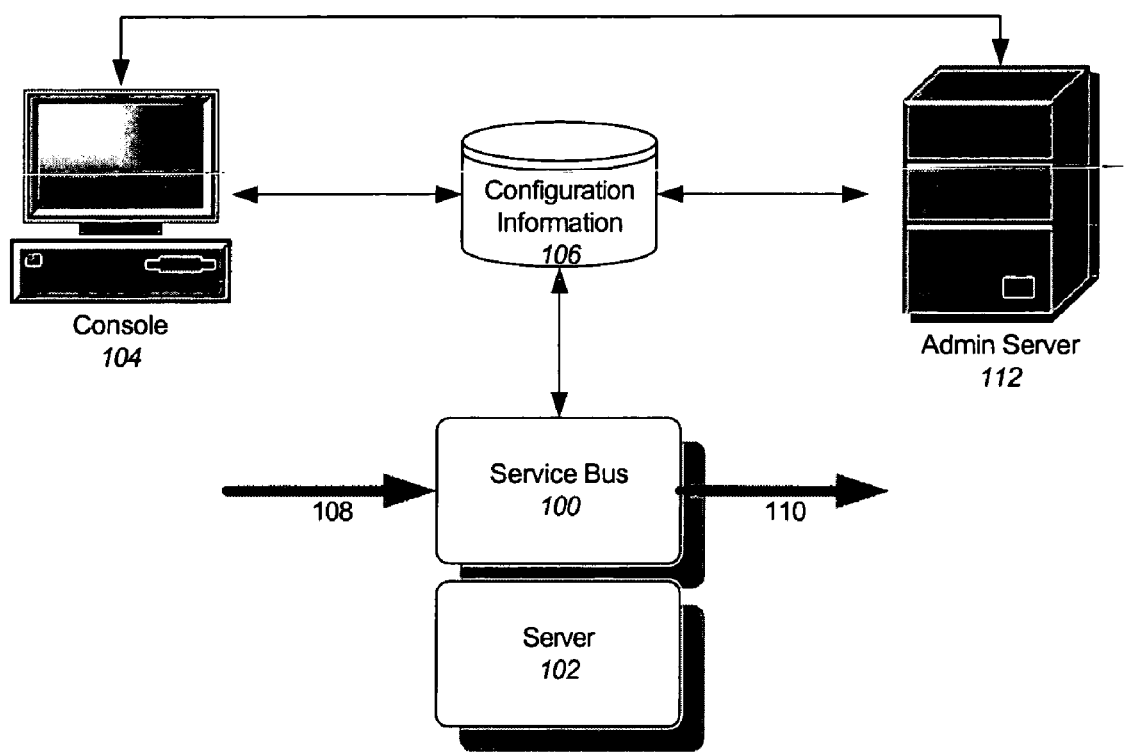
FIG. 1b is an illustration of a service bus architecture in accordance to an embodiment.

FIG. 1*b* is an illustration of a system in accordance to an embodiment. In one embodiment, the system includes a service bus 100 which can act as an intermediary between a client and a service. Note that a client may itself be a service. Messages to the service bus arrive on a transport 108 and can be processed to determine, by way of a example, a destination to route and/or publish the message to, a transformation to perform on the message, and/or security processing. The message then is sent out on transport 110 bound for a service or another service bus. In one embodiment, a response to the message can follow an inverse path through the service bus.

In one embodiment, the service bus can be implemented partially or wholly on an application server 102 such as WebLogic® Server, available from BEA Systems, Inc. The system is driven by configuration information 106 which can specified through the configuration/monitoring console 104 which provides a user interface for creating, modifying and deleting configuration information. All aspects of the system are dynamically configurable. By way of a non-limiting example, a user interface can include one or more of the following: 1) a graphical user interface (GUI) rendered on a display device or projected onto a user's retina; 2) an ability to respond to sounds and/or voice commands; 3) an ability to respond to input from a remote control device (e.g., a cellular telephone, a PDA, or other suitable remote control); 4) an ability to respond to gestures (e.g., facial and otherwise); 5) an ability to respond to commands from a process on the same or another computing device; and 6) an ability to respond to input from a computer mouse and/or keyboard. This disclosure is not limited to any particular user interface. Those of skill in the art will recognize that many other user interfaces are possible and fully within the scope and spirit of this disclosure.

Figure 2:
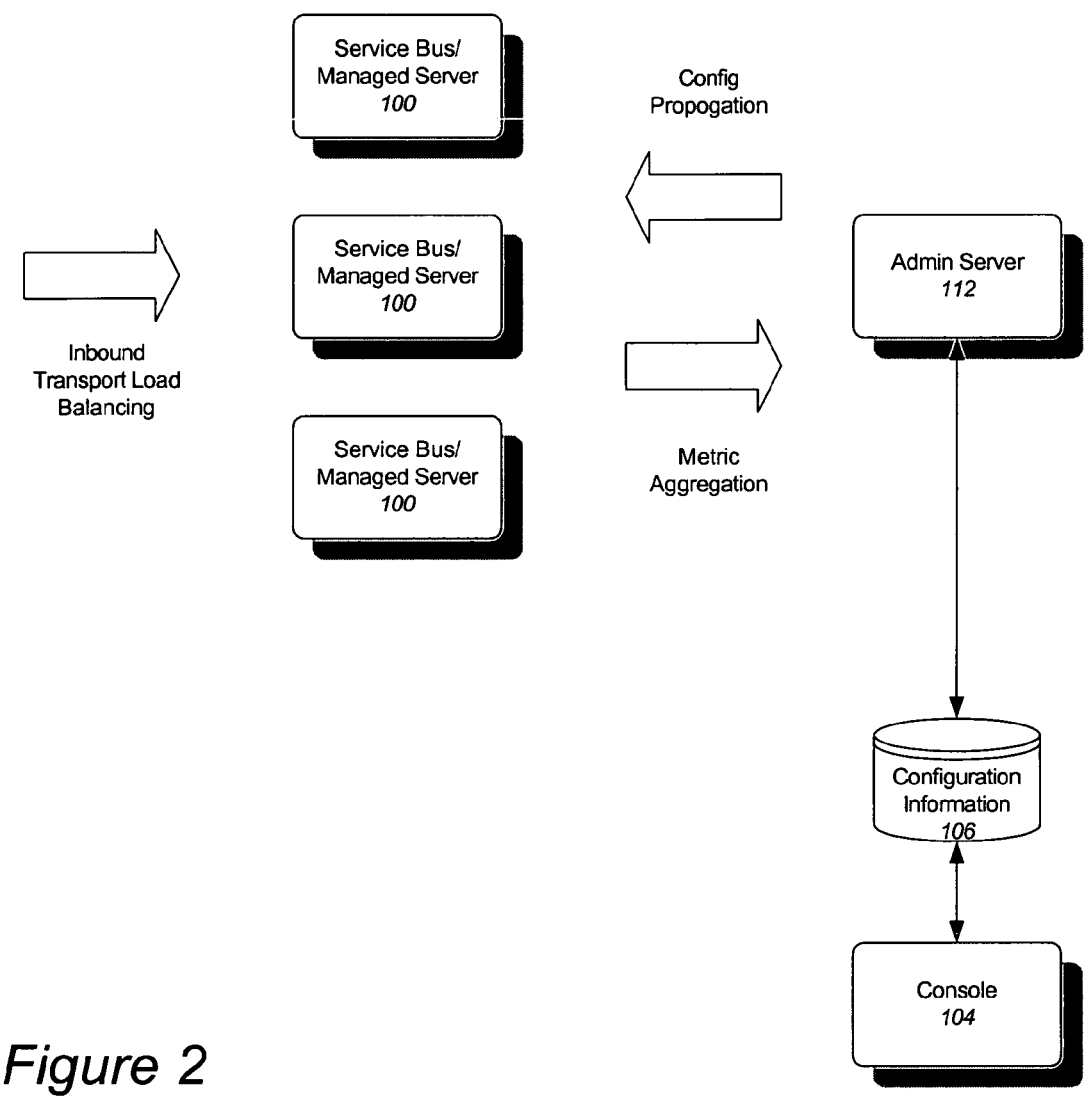
FIG. 2 is an illustration metric aggregation and configuration propagation in accordance to an embodiment.

In one embodiment and with reference to FIG. 2, the configuration information is distributed throughout an enterprise by an administrative server 112 to one or more managed servers 100 hosting service buses. In aspects of these embodiments, managed servers can be deployed in clusters as is well known in the art. Configuration information can be automatically propagated to managed servers for fast local retrieval by service buses. Likewise, monitoring metrics can be automatically collected from all managed servers for aggregation and display on the console.

In one embodiment, a service hosted by the service bus ("service proxies") and services not hosted by the service bus ("external services") but which are invoked by service proxies are both modeled as services. Service proxies act as stand-ins for, or facades of, services (i.e., external services and service proxies). By way of a non-limiting example, a service can include:

A set of concrete interfaces called ports (also called endpoints), each with a transport address and associated configuration. In one embodiment, the set of ports constitutes load balancing and failover alternatives for the service.

An optional abstract interface which in one embodiment is a definition of the structure of message parts in the interface possibly broken down by operations.

A binding that defines the packaging of message parts in the abstract interface to a concrete message and the binding of that message to the transport.

Policies for Web Services Security (WSS) and Web Services Reliable Messaging (WS-RM), authorization policies, and actions needed to be performed transparently by the binding layer (e.g., logging).

In one embodiment, a Web Services Description Language (WSDL) representation of the abstract interface, concrete interface and binding is possible for Simple Object Access Protocol (SOAP) web services based on Hypertext Transfer Protocol (Security) HTTP(S) or Java Messaging Service (JMS) transports. In aspects of this embodiment, a WSDL resource or an existing service could be used as a template for a definition of a new service's interface. Also supported are email, file, WS-RM File Transport Protocol (FTP), and other suitable transports. In one embodiment, the service bus could periodically poll a file system directory to determine if a file is ready for processing in the case of a file transport. The service bus can support request/response and one-way paradigms for HTTP and JMS asynchronous transports. It optionally supports ordered delivery of messages if the underlying transport supports it. In a further embodiment, service bus supports eXternal Markup Language (XML), non XML, binary, Multipurpose Internet Mail Extensions (MIME) with attachments (email), and SOAP packaging.

A service/service proxy can have multiple ports for the same binding. A service/service proxy can define the load balancing policy to use for its ports. In one embodiment, the policies can include round robin and random (weighted or not weighted). The ports can also service as fail-over alternatives on failure. The two concepts are coupled together for a high-availability load balancing scheme.

A service proxy can also define the retry policies on failure and (for request/response) a timeout policy and security policies that apply to messages in its interface. This can be specified at the service level (applies to all messages) or individual messages for the operations of the service. In one embodiment, services are categorized by one or more category schemes. For example, categories can be key names and category values can be values for the key name. A service can have multiple values for multiple category name. Categories are useful for discovery purposes. There are a number of well-known ontologies (or category schemes) that define the key name and allowed hierarchy of values. In aspects of this embodiment, leaf values in a category hierarchy are used to categorize services. In one embodiment, a service consumer can be categorized for searching. Service consumers can be an organization or an application and can send messages (or receive sync responses). In yet another embodiment, a service consumer is associated with credentials and is tied to a user so it can belong to roles for authorization.

In one embodiment, the implementation of a service proxy includes at least one message processing pipeline definition. For example, this can include a definition of a request pipeline definition and a response pipeline. Pipelines are message processing nodes that specify what actions are performed on request messages to the service proxy before invoking an external (or another proxy) service, and what processing is performed on responses from the service invoked by the service proxy before the service proxy returns a response to a client. Each pipeline can include a sequence of stages. A stage implements a programmatic interface and/or a protocol that is compatible with the pipeline. Messages fed into the pipelines are accompanied by a set of message context variables (that includes variables that contain the message contents) that can be accessed or modified by the pipeline stages.

By way of illustration, common pipeline stages include:

A transformation stage allows flow control "if" structures to be nested to select a transformation to be performed that affects the context. A web services callout or database lookup can be an alternative to an XML Query (XQuery) or Extensible Stylesheet Language Transformation (XSLT) transformation to set the output context variable.

A routing stage allows "if" structures and "case" structures to be combined (and nested) to define a single endpoint and operation to route the message to. A set of transformations that affects context variables can be defined before the message is published to each endpoint. A web services callout or database lookup can be an alternative to an XQuery or XSLT transformation to set the context variable.

A publish stage allows "if" structures and "case" structures to be combined (and nested) to define the set of endpoints and operations to publish the message to. A set of transformations that affects context variables can be defined before the message is published to each endpoint. A web services callout or database lookup can be an alternative to an XQuery or XSLT transformation to set the context variable. In one embodiment, the changes to the context are isolated to each published endpoint and do not affect subsequent processing by the pipeline. In one embodiment, WSS processing as well as authorization can be performed in the binding layer.

In one embodiment, the following are exemplary stages:

A tracking stage allows writing a tracking record with user defined information so the tracking system can be used to search by a user defined criteria.

An archiving stage writes the message to an archive for historical and record keeping purposes.

A logging stage allows logging of selected context to the system log for debugging purposes.

A validation stage validates a document against an XML of MFL schema.

A custom stage that implements a programmatic interface and/or protocol that is compatible with pipelines.

Figure 3:
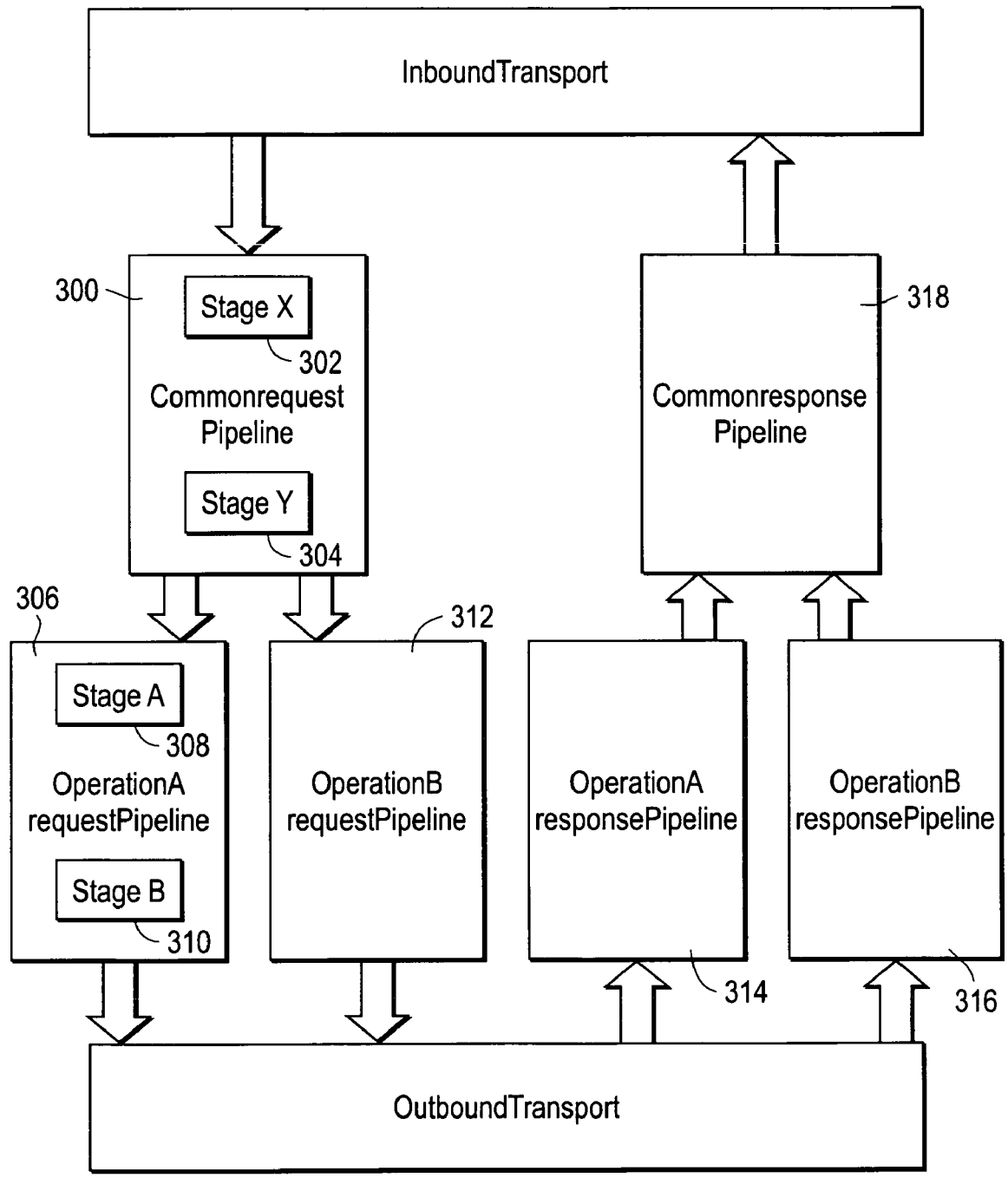
FIG. 3 is an illustration of message processing pipelines in accordance to an embodiment.

FIG. 3 is an illustration of message processing pipelines in accordance to an embodiment. An operational pipeline can process a message based on an operation indicated by the contents of the message. In one embodiment, the determination of the operation is performed through a user-selected criteria. By way of illustration, each pipeline can include one or more stages (e.g., 302, 304, 308, 310). A single service level request pipeline 300 can branch out into a plurality of operational pipelines 306 and 312. The response processing starts with the relevant operation pipeline (314, 316) which then joins into a single service level response pipeline 318. In one embodiment, in the case of one-way operations being invoked, the response pipeline is executed with an empty message. This permits a response to be constructed for the service proxy so bridging between request/response and one-way operations is possible (e.g., the service proxy input could be one-way while its output is request/response or vice versa). The service proxy either absorbs the response from the invoked service or generates one for the client.

In one embodiment, a context is shared across both the request pipeline and response pipeline, and other message processing nodes, and its value includes individual request/response messages. In aspects of this embodiment, the context is a set of predefined XML variables. New variables can be added and deleted to the context dynamically. The predefined context variables have by way of a non-limiting example, information about the message, the transport headers, security principals, the configuration information for the current service proxy and the configuration information for the primary routing and subscription services invoked by the service proxy. In one embodiment, the context can be read and modified by XQuery/Xupdate expressions by the stages.

By way of further illustration, the context can include the variables $header, $body and $attachments. These are wrapper variables that contain the SOAP headers, the SOAP body contents and the MIME attachments respectively. The context gives the impression that all messages are soap messages and non SOAP messages are mapped into this paradigm. In the case of binary or MFL data, the XML element that represents the document in $attachments or $body refers to the actual document with a unique identifier. In the case of SOAP RPC, the body content is itself a wrapper element that contains the typed RPC parameters.

In one embodiment, the system has a built-in type system that is available for use if desired at design time. When creating an XQuery expression in a condition or transformation at design time, the variable can be declared to be of one or more types in an editor to assist in easily creating the XQuery. In a further embodiment, the types can be specified in XML schemas, MFLs or WSDL resources. This type declaration process is aware of the nature of the variable to be typed (is a wrapper for elements of the types or the types themselves). It also provides assistance to access SOAP RPC parameters or documents in $body easily.

In one embodiment, a stage can have a sequence of steps to execute if an error occurs in that stage. This sequence of steps constitute an error pipeline or handler for that stage. In addition an error handler can be defined for the whole pipeline or a whole service proxy. The lowest scoped error handler that exists is invoked on an error. This error handler allows the message to be published to an endpoint, formulate an error response message to be returned to the invoker of the service proxy, log the message, continue after modifying the context, or raise an exception. Raising an exception can transfer control to the next higher scoped error pipeline.

Although exposing information sources and other processes as services provides a number of benefits, it does not address a number of issues such as unified views of information and data transformations. For example, portal applications can be used as the presentation service of web-based applications by aggregating information from a number of back-end information sources (e.g., heterogeneous data sources such as relational databases, XML files, Web services, and custom applications) and assembling generated pages. The portal needs to understand each of the information sources available, what information pieces are stored in each source, the relationships between those pieces of information, and the necessary transformations required to create a single virtual view. The result of this approach is a portal that is prone to breaking when any of the underlying services on which it depends change or when the portal is migrated to a different operating environment.

In one embodiment, these problems can be overcome by creating a unified view of information on behalf of applications such as portals. In one embodiment, this capability can be provided by the Services Platform Data product, available from BEA Systems, Inc. A unified information view makes the complex task of aggregating data from distributed systems easy, allowing developers to access and share business entities without having to deal with the complexities of different data structures, relationships or semantics.

Figure 4:
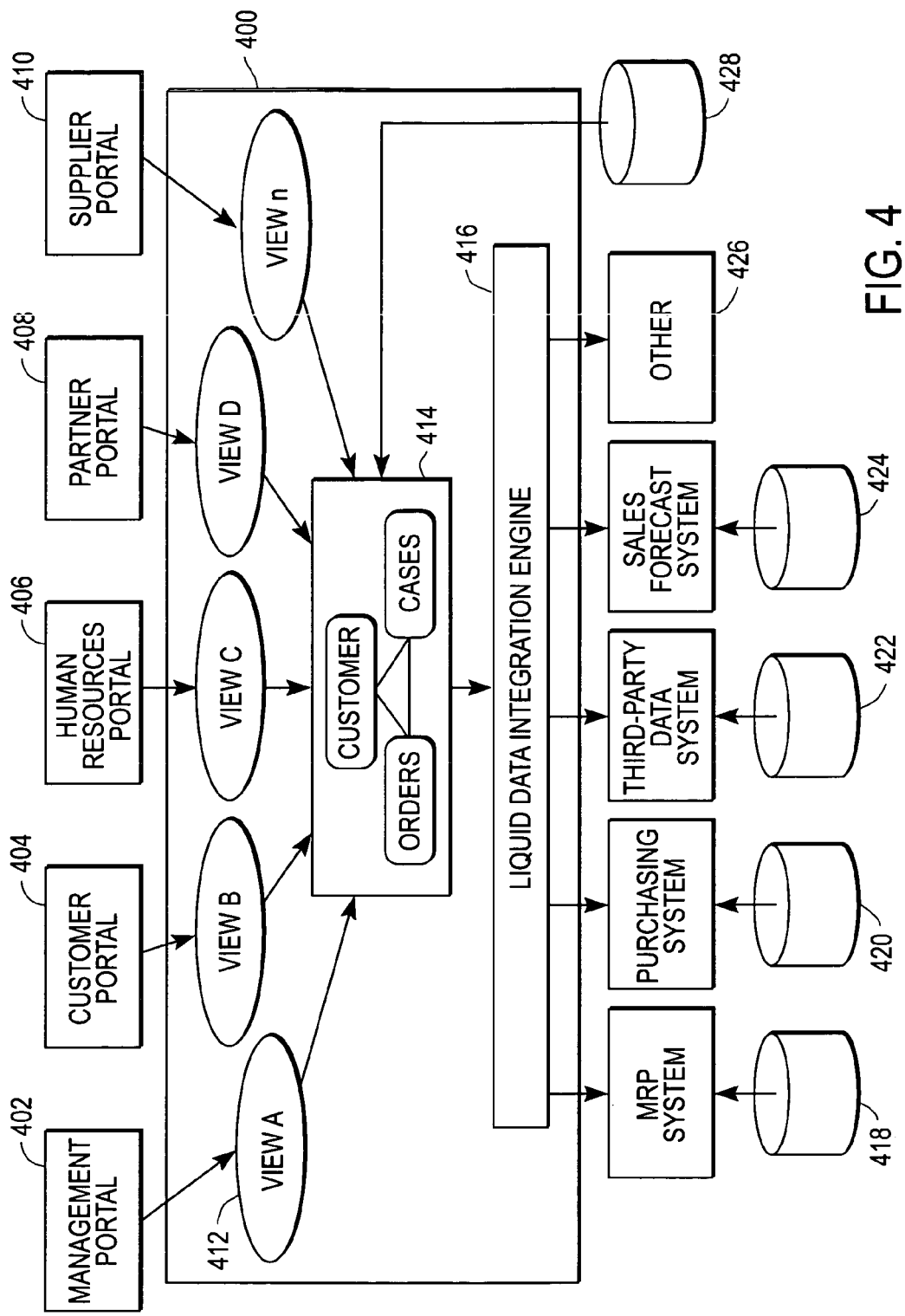
FIG. 4 is an illustration of a system for creating a unified information view in accordance to an embodiment.
Figure 5:
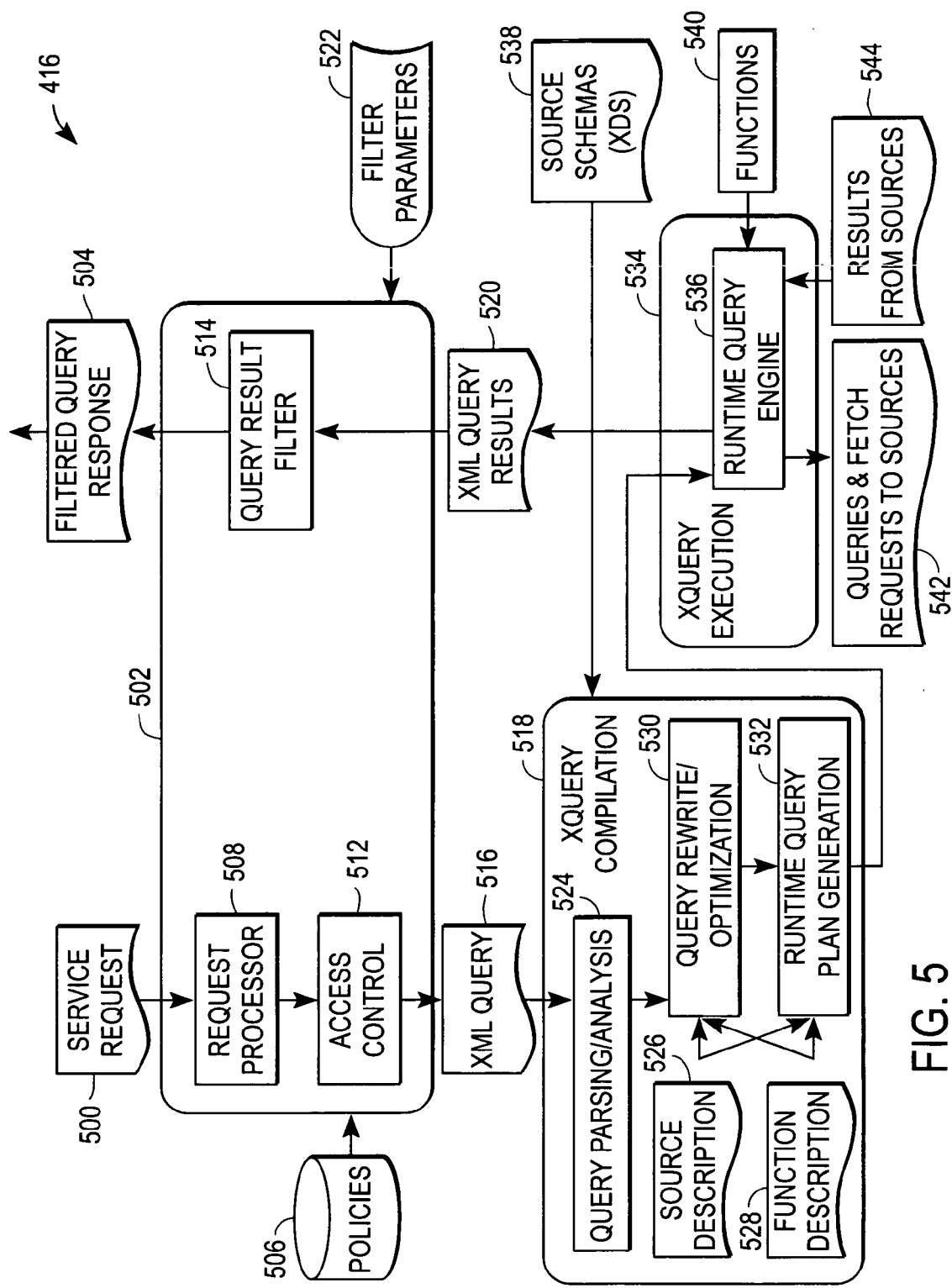
FIG. 5 is a high level schematic of a liquid data integration engine in accordance to an embodiment.

FIGS. 4-5 are functional block diagrams illustrating a system for creating a unified information view in accordance to an embodiment. As shown in FIG. 4, a data services platform framework 400 is used to provide a mechanism by which a set of applications, or application portals 402-410, can integrate with, or otherwise access, a plurality of services. Such services may include a Materials Requirements and Planning (MRP) system 418, a purchasing system 420, a third-party relational database system 422, a sales forecast system 424 and a variety of other data-related services 426. Although not shown in FIG. 4 for clarity, in one embodiment, one or more services platform of the services may interact with one or more other services through the data framework 400 as well.

The data services platform framework 400 employs a data services platform integration engine 416 to process requests from the set of portals to the services. The integration engine 416 allows access to a wide variety of services, including data storage services, server-based or peer-based applications, Web services and other services capable of being delivered by one or more computational devices are contemplated in various embodiments. A services model 414 provides a structured view of the available services to the application portals. In one embodiment, the services model provides a plurality of views 412 that may be filtered, molded, or shaped views of data and/or services into a format specifically suited for each portal application. In one embodiment, data returned by services to a particular application (or other service acting as a requestor or client) is mapped to the view associated with that application (or service) by the data services platform framework. Embodiments providing multiple views of available services can enable organizations to compartmentalize or streamline access to services, thereby increasing the security of the organization's information technology infrastructure. In one embodiment, the services model may be stored in a repository 428 of service models. Embodiments providing multiple services models can enable organizations to increase the flexibility in changing or adapting the organization's information technology infrastructure by lessening dependence on service implementations.

FIG. 5 is a high level schematic of a data services platform integration engine 416 in accordance to an embodiment. The data services platform integration engine includes an interface processing layer 502, a query compilation layer 518 and a query execution layer 534. The interface layer includes a request processor 508, which takes a request 500 and transforms it into an XML query 516 and in one embodiment provides it to the query compilation layer. In another embodiment, the interface layer also includes access control mechanism 512, which can determine based upon at least one policy 506 whether the client, portal application, service or other process making the request is authorized to access the resources and services required to satisfy the request. Provided that the client, application service or other process is authorized to make the request, the interface layer sends the XML query to the query compilation layer.

Within the query compilation layer, a query parsing and analysis mechanism 524 receives the query, parses it and sends the results of the parsing to a query rewrite optimizer 530. In one embodiment, the query rewrite optimizer determines whether the query can be rewritten in order to improve performance of servicing the query based upon one or more of execution time, resource use, efficiency or other performance criteria. The query rewrite optimizer may rewrite or reformat the query based upon input from one or more of a source description 526 and a function description 528 if it is determined that performance may be enhanced by doing so. A runtime query plan generator 532 generates a query plan for the query provided by the query rewrite optimizer based upon input from one or more of the source description and the function description.

The query compilation layer passes the query plan output from the runtime query plan generator to a runtime query engine 536 in the query execution layer. The runtime query engine is coupled with one or more functions 540 that may be used in conjunction with formulating queries and fetch requests to sources 542, which are passed on to the appropriate service(s). The service responds to the queries and fetch requests with results from sources 544. The runtime query engine of the query execution layer translates the results into a format usable by the client or portal application, such as without limitation XML, in order to form the XML query results 520.

In one embodiment, before responses or results are passed back to the client or portal application making the request, a query result filter 514 in the interface layer determines based upon filter parameters 522 what portion of the results will be passed back to the client or portal application, forming a filtered query response 504. Although not shown for clarity, filter parameters may accompany the service request in one embodiment. In yet a further embodiment, the query result filter can also determine based upon access policies what portions of the filtered query response a requestor is permitted to access and may redact the filtered query response accordingly.

In one embodiment, a set of security services is provided which allow enforcement to be performed close to the resources. In a further embodiment, the implementation details of each security service are abstracted through a programmatic service interface. The security infrastructure provided through this approach can be utilized in both the service proxy and service adapter approaches, as well as within applications themselves.

Figure 6:
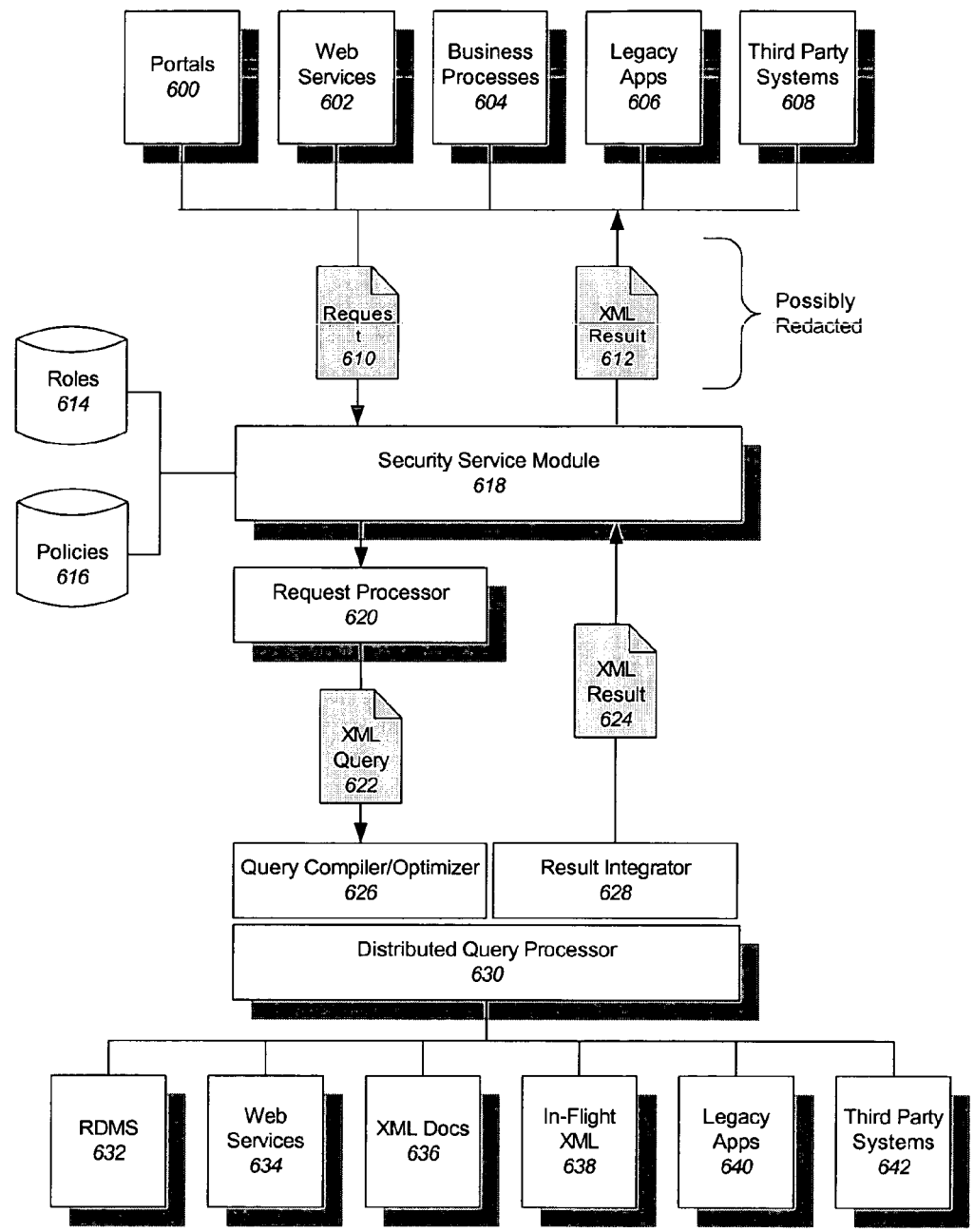
FIG. 6 is an illustration of a security system to an embodiment.

FIG. 6 is an illustration of a security system to an embodiment. Various client requestors 600-608 can interact with the system by generating a request 610 to access one or more resources 632-642. Requestors can include web portals 600, web services 602, business processes 604, legacy applications 606, third party systems 608, and/or any program/device capable of generating a request. In one embodiment, resources can include relational database management systems 632, web services 634, XML documents 636, in-flight XML 638, legacy applications 640, third party systems 642, and/or any program/device capable of responding to a request. In one embodiment, the request is processed by a authorization enforcement point called a Security Service Module (SSM) 618 before reaching a resource. In various embodiments, an SSM can be integrated with a server, application server, web server, a process or any other suitable host such as network firewalls, routers, relays, etc. In aspects of these embodiments, a container (e.g., an Enterprise JavaBean or servlet container) can intercept the request and present it to the SSM. By way of illustration, the SSM can be provided with a request context that includes subject that holds an authenticated identity (e.g., an authenticated user), a resource identifier, user/group information, and/or an object through which the SSM can obtain additional information about the context of the request.

In one embodiment, the SSM determines what roles (if any) the identity of the requestor belongs to based on pre-defined roles 614. This is called role mapping. Role mapping can occur just prior to when an access decision is rendered for a resource. The SMM also determines what policies 616 (if any) apply to the request based on the mapped roles, the target resource and requested action. Access to the resource is granted or denied based on evaluation of the applicable polices.

In one embodiment, if access to the target resource is granted, the request is provided to request processor 620 which can convert the request into an XML Query ("XQuery") 622 or other suitable form. XQuery is a query language for XML that uses the structure of XML to express queries involving varied types of data either physically stored in an XML document or viewed as such. In other embodiments, the request can take the form of a Structured Query Language (SQL) expression or any other means for identifying sought after information. It will be appreciated by those of skill in the art that the present disclosure is not limited to or dependent upon the format of the request.

In one embodiment, the XQuery can then be provided to a query compiler/optimizer 626 which parses the query and determines whether the query can be rewritten in order to improve performance of servicing the query based upon one or more of execution time, resource use, efficiency or other performance criteria. A query plan can be generated and provided to distributed query processor 630 which propagates queries to one or more services (632-642) based on the query plan. Result(s) from the service(s) are assembled and transformed in the result integrator 628 into a result format 624 (e.g., an XML document or other data format) usable by the requestor. In one embodiment, BEA Aqua Logic Data Services Platform, available from BEA Systems, Inc., can be used to provide the functionality of components 620, 626, 628 and 630.

In one embodiment, the result 624 is intercepted by the SSM before it reaches the requestor in order to determine if any data in the result should be redacted. In aspects of this embodiment, the SSM evaluates one or more polices directed to specific parts of the result 624. Only the parts to which the requestor is granted access are returned in the final result 612. Alternatively, the parts to which the requestor is not granted access can be encrypted in the final result 612. In a further embodiment, polices can be used to deny access to specific combinations of data in the result 624. This embodiment allows data to be aggregated from disparate sources (632-642), each of which the requestor might be authorized to access, but when brought together might exceed the requestor's authorization.

Figure 7:
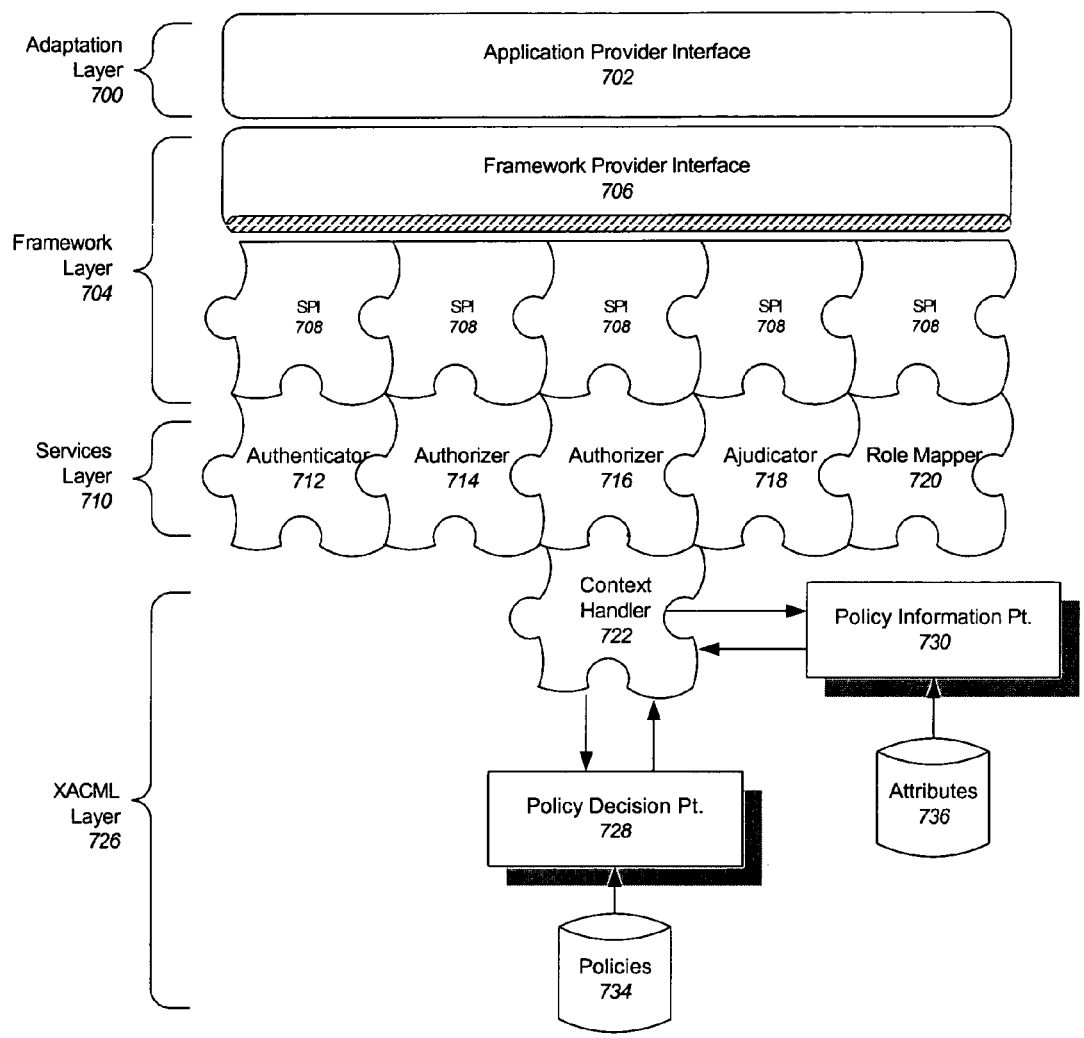
FIG. 7 is an illustration of an security service module in an embodiment.

FIG. 7 is an illustration of an SSM in an embodiment. In aspects of these embodiments, the SSM includes several functional layers that can reside in one or more processes. An adaptation layer 700 ties a framework layer 704 and a services layer 710 to a run-time environment. The adaptation layer includes an Application Program Interface (API) 702 to allow exploitation of the framework layer in the run-time environment. In aspects of these embodiments, an API can comprise a programmatic interface (e.g., class, method and/or function definitions), a communication interface such as a web service or other suitable mechanism for exchanging messages, and/or any other suitable protocol for invoking functionality and exchanging information. The present disclosure is not limited to or dependent on any API implementation presently known or yet to be developed, as will be appreciated by those of skill in the art.

The adaptation layer can invoke services of the framework layer via a framework programming interface (FPI) 706. In one embodiment, the adaptation layer invokes the FPI to process inbound requests 610 and outbound results 624, which in turn affords each service provider module 712-720 in the services layer the opportunity to process the request/result. The framework layer can invoke services of the services layer via a service provider interface (SPI) 708. As with the adaptation layer API, the FPI and SPI can comprise a programmatic interface (e.g., class, method and/or function definitions), a communication interface such as a web service or other suitable mechanism for exchanging messages, and/or any other suitable protocol for invoking functionality and exchanging information. The present disclosure is not limited to or dependent on any FPI/SPI implementation presently known or yet to be developed, as will be appreciated by those of skill in the art.

In aspects of these embodiments, the FPI can translate API invocations into one or more SPI invocations. The FPI also hides the SPI from the adaptation layer, thus preventing any dependency on the SPI from forming. The SPI provides the FPI access to a set of dynamically configurable security services represented as "plug in" security provider modules ("providers") 712-720. Each provider is compatible with the SPI (e.g., each provider implements the SPI). The services layer can accommodate more than one provider of the same type. In another embodiment, the adaptation layer can communicate directly with the services layer, without an intervening framework layer (e.g., the API could invoke the SPI directly).

In one embodiment and by way of illustration, authenticator 712 is used to access a credential exchange service which allows the exchange of the current requestor's identity to be used to obtain the appropriate set of credentials with which to authenticate target resource(s). In one embodiment, role mapping provider(s) 720 dynamically determine applicable roles based on role definitions 614 before authorization provider(s) 714-716 are invoked to individually render a decision regarding whether or not a requestor is authorized to submit the request or receive the response. In aspects of this embodiment, an authorization provider can evaluate policies 616 based on mapped roles to determine whether or not access to a resource should be granted. In yet another embodiment, the determination of each authorization provider is used to render a final grant or deny decision by the adjudicator provider 718. For example, the adjudicator may grant access to a resource only if all authorization providers would grant access. Other provider types are possible (not shown): authentication provider(s) can authenticate, verify, and map security tokens to an internal format and support, for example, a single sign-on capability; audit provider(s) can audit some or all security actions taken by the framework layer; and credential mapping provider(s) can map authentication credentials for a user to legacy application for single sign-on.

In one embodiment, the response 624 can have an authorization check performed against its contents prior to returning it to the requestor (as response 612). In aspects of this embodiment, the eXtensible Access Control Markup Language (XACML), indicated as XACML Layer 726 in FIG. 7, provides a general-purpose language for representing and evaluating access control policies in this regard. The XACML standard is maintained by the Organization for the Advancement of Structured Information Standards (OASIS), a global consortium. (An implementation of XACML for the Java® programming language is available from Sun Microsystems, Inc.) XACML supports the use of XPath expressions for addressing locations within structured data, such as an XML document, allowing the document to have policies written against its contents.

In one embodiment, an authorization provider 716 can act as a XACML Policy Enforcement Point (PEP). The PEP communicates with an XACML context handler 722 which has access to the result 624. In order to enforce policy, the context handler can formalize attributes 736 describing the requestor at Policy Information Point (PIP) 730 and delegate the authorization decision to a Policy Decision Point (PDP) 728. Applicable policies are located in a policy store 734 and are evaluated at the PDP, which then returns an access decision to the context handler. In one embodiment, policies 616 can be automatically translated to XACML policies 734, and vice versa. In another embodiment, all policies in the system are represented as XACML policies and wherein an authorization provider can elect to use the policies and further elect to translate the policies to a form suitable for evaluation.

An XACML policy comprises a set of rules, an optional set of obligations, and the identity of a rule-combining algorithm to adjudicate results from more than one policy to yield a single result. Obligations for rules evaluated by the PDP are provided by the PDP to the PEP for enforcement upon a grant or deny authorization decision by the PDP. An obligation can be used to trigger any kind of action in the PEP, including in one embodiment removing data from (or encrypting data in) the result 624 which the requestor is not authorized to see or access. The modified result 612 can then be safely provided to the requestor.

Figure 8:
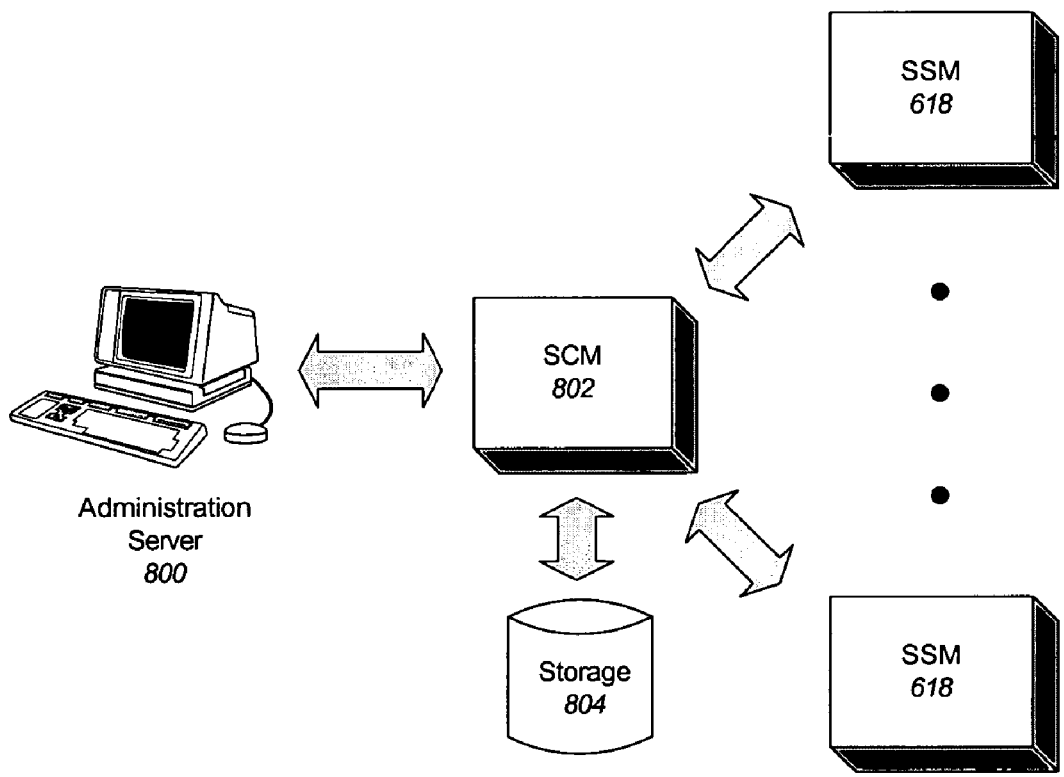
FIG. 8 is an illustration of system components to propagate security information in accordance to an embodiment.

In one embodiment, SSMs are part of a distributed security network. FIG. 8 is an illustration of system components to propagate security information in accordance to an embodiment. In one embodiment, policy and/or SSM configuration information (hereinafter "security information") is distributed to SSMs via Security Control Mangers (SCMs) 802. This is referred to as "provisioning". SCMs can reside anywhere on a computer network. In one embodiment, an SCM resides locally on systems that have one or more SSMs. An administration server 800 can provision the security information to an SCM periodically. In one embodiment, the information provisioned to an SCM is only relevant to SSMs deployed on the same system as the SCM. In aspects of these embodiments, only changes ("deltas") to this information are propagated to SCMs. This is desirable since it can reduce the amount of information that needs to be transmitted between the administration server and the SCMs. By way of illustration, this can be accomplished by associating a version number with provisioning information or subsets thereof.

SCMs can cache provisioned information in a local store 804 and further provision it to one or more SSMs. In one embodiment, an SCM provisions information to SSMs that reside on the same system as the SCM. In various embodiments, provisioned information can specify security providers, locations of directory servers, databases, XACML configuration information, and other suitable information. By way of illustration, an SSM can dynamically incorporate security providers based on configuration information supplied to it by an SCM.

The SCM has many architectural benefits for the system. Firstly, the SCM can serve as the sole external management interface for all SSM components. This can eliminate redundant management infrastructure in system components, thus allowing all system components to take advantage of improvements in future versions of the SCM management interface. Secondly, having a single management interface per computing device has security benefits. An SCM-enabled host can expose a single management communication channel rather than one per SSM. This eliminates the need for a listen port in each SSM process, drastically reducing the number of open ports that are required to be secured and monitored. Finally, the use of the SCM can greatly simplify SSM configuration. Rather than relying on instance specific configuration files, an SSM can retrieve its entire configuration from the SCM via a well-known communication port.

In one embodiment, an SCM can supply provisioned information to SSMs as needed (e.g., in response to requests by SSMs). In another embodiment, the SCM can also convey the information automatically without being requested to do so. In aspects of these embodiments, an SCM only provides provisioning information to an SSM is that relevant to that SSM and, in further aspects, only provides deltas to SSMs. In various embodiments, communication between system components can be accomplished with secure protocols. By way of illustration, mutually authenticated Transport Layer Security (TSL) connections can be utilized between components. In addition, the SCM and SSM can exchange Public-Key Infrastructure (X.509) certificates to establish identity and trust.

To facilitate the management of a potentially large number of distributed SSMs, the administration server uses a remote administration mechanism to distribute security information to each SSM. In various embodiments, the SCM is a component of this remote administration mechanism. Each SCM is responsible for storing 804 and maintaining policy and configuration information for all SSMs that it are associated with. In one embodiment, an SCM is associated with the SSMs on its local machine. When a change to an SSM's configuration or policy is made and distributed from an administration console, an SCM receives the change and updates its cached copy of the configuration. The change is then propagated to the SSM which can adapt to the configuration change dynamically or at a later time. In addition to facilitating management, the SCM enables SSMs to operate in the absence of the administration server. Since SCMs maintain a persistent copy of each configuration, new SSMs can be started and existing SSMs can continue to function, even if the Administration server goes down.

In one embodiment, the administration console can provide a graphical user interface for defining policies. For example, the user interface could provide a rendering of the XML document 624 that would allow a user to interactively select elements of the document and define the policy required to access those elements. In a further embodiment, a graphical editor or wizard that would present the user with easy-to-follow steps for defining a policy, such that the user would not require any knowledge of the underlying policy mechanism.

Although this embodiment was described with reference to a graphical user interface, a user interface is not limited to such and can include one or more of the following: an ability to respond to sounds and/or voice commands; an ability to respond to input from a remote control device (e.g., a cellular telephone, a PDA, or other suitable remote control); an ability to respond to gestures (e.g., facial and otherwise); an ability to respond to commands from a process on the same or another computing device; and an ability to respond to input from a computer mouse and/or keyboard. This disclosure is not limited to any particular user interface. Those of skill in the art will recognize that many other user interfaces presently known and yet to be developed are possible and fully within the scope and spirit of this disclosure.

Figure 9:
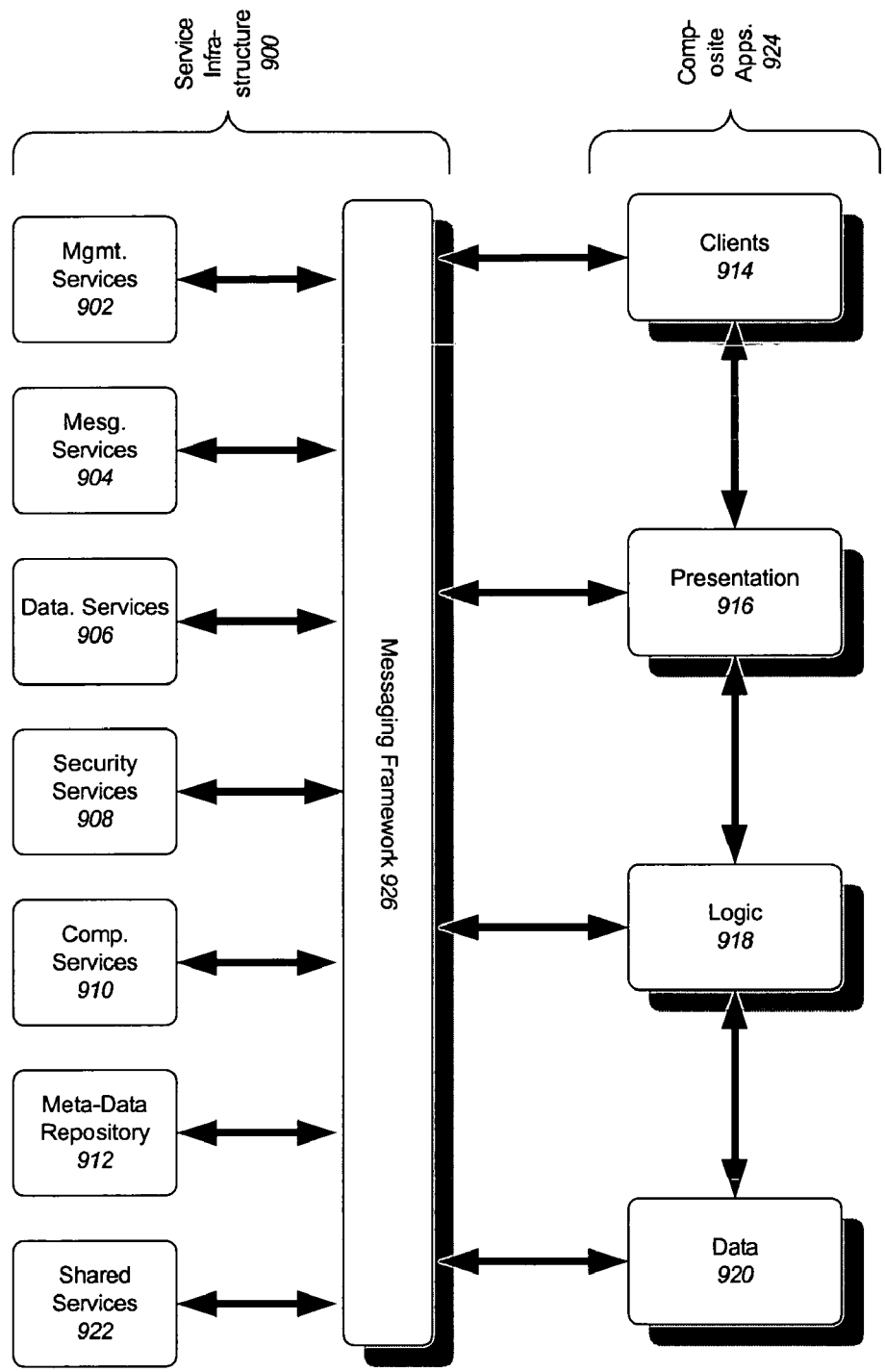
FIG. 9 is an illustration of a system in accordance to an embodiment.

When coupled with concepts such as data transformation services and Enterprise Service Bus, the system allows enterprises to dynamically assembly new applications with minimal developer involvement. FIG. 9 is an illustration of a system in accordance to an embodiment. In one embodiment, applications/services/processes 924 communicate with each other and with other applications/services/processes through a common messaging framework 926 which acts as a logical bus. Together, the messaging framework and its services (902-912 and 922) comprise a service infrastructure 900. The messaging framework is made possible through messaging services 904 (e.g., service bus) which provide message management, a service registry and service management. Data services 906 (e.g., liquid data) include functionality for unified data modeling and composite data management. Security services 908 (e.g., SSM, SCM) provide distributed application security management and federated identity management. Management services 902 allow dynamic configuration of the service infrastructure.

Composition services 910 include processor orchestration mechanisms such as business process management, business rules, enterprise connectivity and business activity management. Information needed to compose services is included in the meta-data repository 912. Services such as performance monitoring, service level agreements, data views, etc., are available to all services/applications through one or more shared services 922. Clients 914 such as web browsers and other applications can communicate with the processes such as portals, web services and web services which are included in the presentation tier 916. Likewise, presentation tier processes can communicate with logic components 918 such as other web services. Finally, logic components can access backend data sources 920 such as relational databases. Each of these elements 914-920 can interact with the other through the messaging framework.

Figure 10:
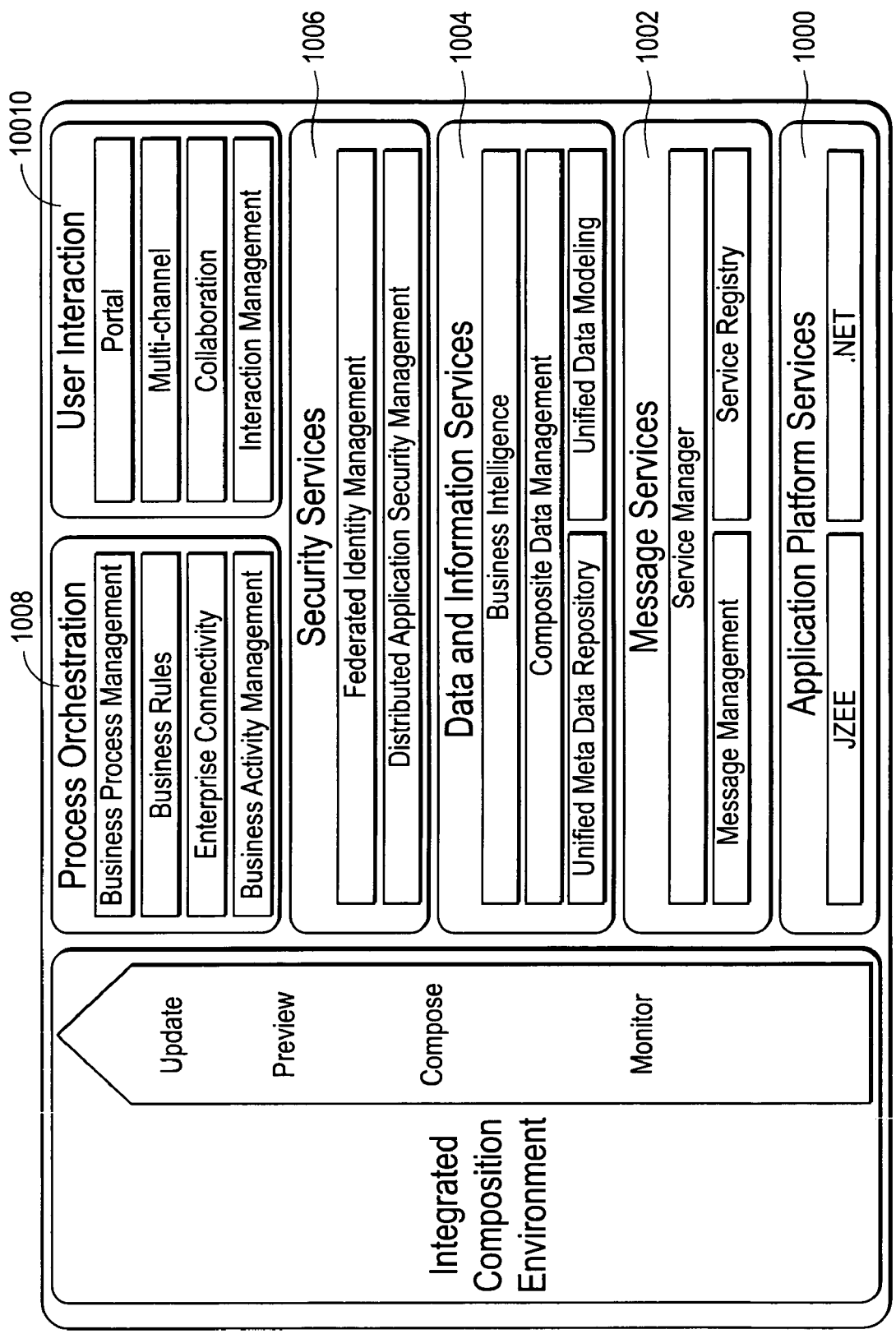
FIG. 10 is an illustration of an integrated service composition system in accordance to an embodiment.

FIG. 10 is an illustration of an integrated service composition system in accordance to an embodiment. The bottommost application platform services layer 1000 provides a runtime environment for a service implementation, such as J2EE or .Net. Above this layer, a message services layer 1002, data and information services layer 1004, and security services layer 1006 provide functionality as described above in relation to service infrastructure components 904, 906 and 908, respectively. A process orchestration layer 1008 is logically dependent on these underlying layers and allows the programming language independent composition of services through user interfaces which present services as entities that can be connected through the service infrastructure. User interaction components 1010 allow services and composed services to face a user through a user interface such as, but not limited to, a web portal.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Various embodiments include a computer program product which is a non-transitory storage medium (media) having instructions stored thereon/in which can be used to program a general purpose or specialized computing processor(s)/device(s) to perform any of the features presented herein. The non-transitory storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the non-transitory computer readable medium (media), the present disclosure includes software for controlling both the hardware of general purpose/ specialized computer(s) and/or processor(s), and for enabling the computer(s) and/or processor(s) to interact with a human user or other mechanism utilizing the results of the present invention. Such software may include, but is not limited to, device drivers, operating systems, execution environments/ containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for interconnecting a plurality of processes in a switching fabric, comprising:
   receiving requests for communication between a plurality of processes, wherein the processes can be one or more of a client, business process, service, web service, or service proxy, and wherein the requests for communication can include requests to access resources;
   associating each request for communication with a context that includes a plurality of message processing variables which are dynamically configurable as the request is processed;
   resolving transport protocol variances dynamically for a particular request, using the context and the plurality of message processing variables associated with that request, among the plurality of processes;
   resolving message format variances dynamically for a particular request, using the context and the plurality of message processing variables associated with that request, among the plurality of processes;
   conveying, subject to authorization, the requests for communication, as resolved for transport protocol and message format variances, between the plurality of processes; and
   receiving at least one of the requests for communication, and its associated context, at a security service module (SSM) that is integrated with and provides security services for a server, including controlling access to the resources at the server;
   using an adjudicator and a plurality of authorization providers that are integrated with the SSM, to determine whether to convey the requests for communication or to grant the requests to access resources for a particular resource;

wherein each of the plurality of authorization providers individually renders a decision based on the request and its associated context, whether to grant access to the particular resource; and wherein the adjudicator uses the decisions to render an overall decision with respect to access to the particular resource, and only conveys the requests for communication or grants the requests to access if each of the plurality of authorization providers would individually grant access to that resource.

2. The method of claim 1, further comprising:
satisfying authentication and/or authorization requirements among the plurality of processes.

3. The method of claim 1 wherein the conveying includes:
routing a message to a process in the plurality of processes based on information in the message.

4. The method of claim 1 wherein the resolving message format incompatibilities includes:
converting a message to a format that is compatible with a destination process in the plurality of processes.

5. The method of claim 1 wherein the resolving transport protocol incompatibilities includes:
sending a message to a destination process in the plurality of processes via a transport protocol that is compatible with the destination process.

6. The method of claim 1 wherein:
a transport protocol is one of: File Transfer Protocol (FTP), Hypertext Transfer Protocol (HTTP), HTTP/Secure (HTTPS), Java Message Service (JMS), file and electronic mail.

7. The method of claim 1 wherein:
the switching fabric is a message processing graph that includes a plurality of interconnected message processing nodes through which the message traffic is conveyed.

8. A non-transitory computer readable storage medium having instructions stored thereon that when used cause a system to:
receive requests for communication between a plurality of processes, wherein the processes can be one or more of a client, business process, service, web service, or service proxy, and wherein the requests for communication can include requests to access resources;
associate each request for communication with a context that includes a plurality of message processing variables which are dynamically configurable as the request is processed;
resolve transport protocol variances dynamically for a particular request, using the context and the plurality of message processing variables associated with that request, among the plurality of processes;
resolve message format variances dynamically for a particular request, using the context and the plurality of message processing variables associated with that request, among the plurality of processes;
convey, subject to authorization, the requests for communication, as resolved for transport protocol and message format variances, between the plurality of processes; and
receive at least one of the requests for communication, and its associated context, at a security service module (SSM) that is integrated with and provides security services for a server, including controlling access to the resources at the server;
use an adjudicator and a plurality of authorization providers that are integrated with the SSM, to determine whether to convey the requests for communication or to grant the requests to access resources for a particular resource;
wherein each of the plurality of authorization providers individually renders a decision based on the request and its associated context, whether to grant access to the particular resource; and
wherein the adjudicator uses the decisions to render an overall decision with respect to access to the particular resource, and only conveys the requests for communication or grants the requests to access if each of the plurality of authorization providers would individually grant access to that resource.

9. A service infrastructure comprising:
a processor
a message services layer is implemented on the processor and configured to interconnect a plurality of processes through at least one service proxy, and to receive requests for communication between a plurality of processes and associate each request with a context that includes a plurality of message processing variables which are dynamically configurable as the request is processed, wherein the processes can be one or more of a client, business process, service, web service, or service proxy, and wherein the requests for communication can incorporate requests to access resources;
a information services layer is implemented on the processor and configured to provide a unified view of information obtained from a plurality of information sources including resolving transport protocol variances dynamically for a particular request, using the context and the plurality of message processing variables associated with that request, among the plurality of processes;
resolving message format variances dynamically for a particular request, using the context and the plurality of message processing variables associated with that request, among the plurality of processes;
a security services layer is implemented on the processor and configured to provide distributed security to the message services layer through a security service module (SSM) that is integrated with and provides security services for a server, including controlling access to the resources at the server; and
wherein each of a plurality of authorization providers individually renders a decision based on the request and its associated context, whether to grant access to a particular resource;
wherein an adjudicator uses the decisions from the plurality of authorization providers that are integrated with the SSM, to render an overall decision with respect to access to the resource, and only conveys the requests for communication or grants the requests to access if each of the plurality of authorization providers would individually grant access to that resource.

10. The service infrastructure of claim 9 wherein:
the information services layer is further configured to redact a portion of the information obtained based on a security policy.

11. The service infrastructure of claim 9 wherein:
the security services layer is further configured to provision security information.

12. The service infrastructure of claim 9 wherein:
the security services layer is further configured to guard a resource.

13. The service infrastructure of claim 9, wherein the message services layer further comprises:
a plurality of message processing nodes that are each configured to perform at least one action based message traffic flowing between the plurality of processes.

14. The service infrastructure of claim 13 wherein:
an action is one of: resolving transport protocol variances dynamically among the plurality of processes; resolving message format variances dynamically among the plurality of processes; conveying message traffic between the plurality of processes; and satisfying authentication and/or authorization requirements among the plurality of processes.

15. A network accessible device configured to perform the steps of claim 1.

16. A system comprising one or more components capable of performing the following steps:
receiving requests for communication between a plurality of processes, wherein the processes can be one or more of a client, business process, service, web service, or service proxy, and wherein the requests for communication can include requests to access resources;
associating each request for communication with a context that includes a plurality of message processing variables which are dynamically configurable as the request is processed;
resolving transport protocol variances dynamically for a particular request, using the context and the plurality of message processing variables associated with that request, among the plurality of processes;
resolving message format variances dynamically for a particular request, using the context and the plurality of message processing variables associated with that request, among the plurality of processes;
conveying, subject to authorization, the requests for communication, as resolved for transport protocol and message format variances, between the plurality of processes; and
receiving at least one of the requests for communication, and its associated context, at a security service module (SSM) that is integrated with and provides security services for a server, including controlling access to the resources at the server;
using an adjudicator and a plurality of authorization providers that are integrated with the SSM, to determine whether to convey the requests for communication or to grant the requests to access resources for a particular resource;
wherein each of the plurality of authorization providers individually renders a decision based on the request and its associated context, whether to grant access to the particular resource; and
wherein the adjudicator uses the decisions to render an overall decision with respect to access to the particular resource, and only conveys the requests for communication or grants the requests to access if each of the plurality of authorization providers would individually grant access to that resource;
wherein the system includes at least one processor.

17. The system of claim 16, further capable of performing the following step:
satisfying authentication and/or authorization requirements among the plurality of processes.

18. The system of claim 16, further capable of performing the following step:
routing the message to a process in the plurality of processes based on information in the message.

19. The system of claim 16, further capable of performing the following step:
converting the message to a format that is compatible with a destination process in the plurality of processes.

20. The system of claim 16, further capable of performing the following step:
sending the message to a destination process in the plurality of processes via a transport protocol that is compatible with the destination process.

21. The method of claim 1, wherein at least one of the multiple authorization providers uses roles and policies to determine whether access to the resource should be granted.

* * * * *